(12) United States Patent
Rao et al.

(10) Patent No.: US 12,056,290 B2
(45) Date of Patent: Aug. 6, 2024

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Yang Rao, Shenzhen (CN); Leli Peng, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/429,102

(22) PCT Filed: May 28, 2021

(86) PCT No.: PCT/CN2021/096939
§ 371 (c)(1),
(2) Date: Aug. 6, 2021

(87) PCT Pub. No.: WO2022/205604
PCT Pub. Date: Oct. 6, 2022

(65) Prior Publication Data
US 2024/0028135 A1    Jan. 25, 2024

(30) Foreign Application Priority Data
Apr. 2, 2021    (CN) .......................... 202110365422.9

(51) Int. Cl.
*G06F 3/03*    (2006.01)
(52) U.S. Cl.
CPC ................................ *G06F 3/0304* (2013.01)

(58) Field of Classification Search
CPC combination set(s) only.
See application file for complete search history.

(56) References Cited

U.S. PATENT DOCUMENTS

| | | | |
|---|---|---|---|
| 2005/0200291 A1* | 9/2005 | Naugler, Jr. | ........... H10K 59/40 315/149 |
| 2013/0027354 A1* | 1/2013 | Yabuta | ................ G02F 1/13338 345/175 |

(Continued)

FOREIGN PATENT DOCUMENTS

| | | |
|---|---|---|
| CN | 101093293 A | 12/2007 |
| CN | 101105614 A | 1/2008 |

(Continued)

OTHER PUBLICATIONS

PCT International Search Report for International Application No. PCT/CN2021/096939, mailed on Nov. 29, 2021, 7pp.

(Continued)

*Primary Examiner* — William Boddie
*Assistant Examiner* — Alecia D English
(74) *Attorney, Agent, or Firm* — The Roy Gross Law Firm, LLC; Roy Gross (57) ABSTRACT

The present application discloses a display panel and a display device. The display panel includes a plurality of first scan lines, a plurality of second scan lines, a plurality of first read lines, a plurality of second read lines, and a plurality of sensing modules. The first scan lines and the second scan lines are alternately arranged and/or the first read lines and the second read lines are alternately arranged. The sensing modules are disposed at intersections of the first scan lines and the first read lines and intersections of the second scan lines and the second read lines.

16 Claims, 7 Drawing Sheets

(56) References Cited

U.S. PATENT DOCUMENTS

| | | | | |
|---|---|---|---|---|
| 2015/0015543 A1* | 1/2015 | Hsieh | ................ | G06F 3/0421 |
| | | | | 345/175 |
| 2018/0120614 A1* | 5/2018 | Shin | ................ | G09G 3/3607 |
| 2020/0033994 A1 | 1/2020 | Shin et al. | | |

FOREIGN PATENT DOCUMENTS

| | | | |
|---|---|---|---|
| CN | 102402347 | A | 4/2012 |
| CN | 102609137 | A | 7/2012 |
| CN | 110007806 | A | 7/2019 |
| CN | 110472615 | A | 11/2019 |
| CN | 111651083 | A | 9/2020 |
| CN | 112462978 | A | 3/2021 |
| CN | 112698755 | A | 4/2021 |
| KR | 20110068537 | A | 6/2011 |
| TW | 200805222 | A | 1/2008 |
| TW | 201122624 | A | 7/2011 |
| WO | 2014183402 | A1 | 11/2014 |

OTHER PUBLICATIONS

PCT Written Opinion of the International Searching Authority for International Application No. PCT/CN2021/096939, mailed on Nov. 29, 2021, 9pp.

Chinese Office Action issued in corresponding Chinese Patent Application No. 202210048755.3 dated May 25, 2023, pp. 1-6.

Chinese Office Action issued in corresponding Chinese Patent Application No. 202110365422.9 dated Nov. 18, 2021, pp. 1-7, 13pp.

\* cited by examiner

DISPLAY PANEL AND DISPLAY DEVICE

CROSS REFERENCE TO RELATED APPLICATIONS

This application is a National Phase of PCT Patent Application No. PCT/CN2021/096939 having International filing date of May 28, 2021, which claims the benefit of priority Chinese Application No. 202110365422.9, filed on Apr. 2, 2021. The contents of the above applications are all incorporated by reference as if fully set forth herein in their entirety.

FIELD OF INVENTION

The present application is related to the field of display technology and specifically to a display panel and a display device including the display panel.

BACKGROUND OF INVENTION

In order to broaden commercial and household functions of liquid crystal displays, many functions are now integrated into the liquid crystal displays, such as color temperature sensing, laser sensing, gas sensing, etc., so as to increase application scenarios of the liquid crystal displays. However, many integrated functions are in a new development stage, and there are still many processes and related designs that need to be improved to enhance performance of the liquid crystal displays with multiple integrated functions.

Currently, applications of laser sensing technology in display panel mainly includes one-gate one-data (1G1D) technology and half-gate two-data (HG2D) technology. In a distributed structure of 1G1D sensing modules, with a panel size increasing, a read time corresponding to each sensing module decreases, thereby affecting accuracy of signal reading. In a distribution structure of HG2D sensing modules, a read time of each sensing module can be increased by increasing a number of read lines, but an increase in the number of the read lines leads to higher costs.

Therefore, current display panels with laser sensing structures cannot well balance increasing read time and controlling costs.

SUMMARY OF INVENTION

The present application provides a display panel and a display device that can solve, which can solve a technical problem of prior art that increasing read time and controlling costs in laser sensing structures cannot be well balanced.

In order to solve the above technical problem, the present application provides a display panel including:
  a plurality of scan lines arranged along a first direction and including a plurality of first scan lines and a plurality of second scan lines;
  a plurality of read lines arranged along a second direction and including a plurality of first read lines and a plurality of second read lines, the second direction crosses the first direction and form a preset angle with the first direction, the first scan lines and the second scan lines are alternately arranged, and/or the first read lines and the second read lines are alternately arranged; and
  a plurality of sensing modules configured to detect a light spot, wherein at least one of the sensing modules is positioned in a coverage region of the light spot, the sensing modules includes a plurality of first sensing modules and a plurality of second sensing modules, one of the first sensing modules is disposed at an intersection of any one of the first scan lines and any one of the first read lines, and one of the second sensing modules is disposed at an intersection of any one of the second scan lines and any one of the second read lines.

In an embodiment of the present application, a minimum distance between one of the first sensing modules and one of the second sensing modules is less than or equal to $$\frac{\sqrt{2}}{2}D,$$

and D is a diameter of the light spot.

In an embodiment of the present application, a distance between two adjacent scan lines is equal to D/2, and a distance between two adjacent read lines is equal to D/2.

In an embodiment of the present application, at least one of a distance between two adjacent scan lines or a distance between two adjacent read lines is less than D/2.

In an embodiment of the present application, the diameter D of the light spot ranges from 2 to 4 millimeters.

In an embodiment of the present application, a number of the first scan lines is equal to a number of the second scan lines, and a number of the first read lines is equal to a number of the second read lines.

In an embodiment of the present application, the first scan lines and the second scan lines are alternately arranged, the second read lines are disposed between two adjacent first read lines, or the first read lines are disposed between two adjacent second read lines.

In an embodiment of the present application, the first read lines and the second read lines are alternately arranged, the second scan lines are disposed between two adjacent first scan lines, or the first scan lines are disposed between two adjacent second scan lines.

In an embodiment of the present application, two adjacent second sensing modules and the first sensing modules positioned between the two adjacent second sensing modules are distributed in a rhombic shape or a hexagonal shape; or
  two adjacent first sensing modules and the second sensing modules positioned between the two adjacent first sensing modules are distributed in the rhombic shape or the hexagonal shape.

According to the above purpose, the present application further provides a display device. The display device includes a display panel. The display panel includes:
  a plurality of scan lines arranged along a first direction and including a plurality of first scan lines and a plurality of second scan lines;
  a plurality of read lines arranged along a second direction and including a plurality of first read lines and a plurality of second read lines, the second direction crosses the first direction and form a preset angle with the first direction, the first scan lines and the second scan lines are alternately arranged, and/or the first read lines and the second read lines are alternately arranged; and
  a plurality of sensing modules configured to detect a light spot, wherein at least one of the sensing modules is positioned in a coverage region of the light spot, the sensing modules includes a plurality of first sensing modules and a plurality of second sensing modules, one of the first sensing modules is disposed at an intersection of any one of the first scan lines and any one of the first read lines, and one of the second sensing modules is disposed at an intersection of any one of the second scan lines and any one of the second read lines.

In an embodiment of the present application, a minimum distance between one of the first sensing modules and one of the second sensing modules is less than or equal to $$\frac{\sqrt{2}}{2}D,$$

and D is a diameter of the light spot.

In an embodiment of the present application, a distance between two adjacent scan lines is equal to D/2, and a distance between two adjacent read lines is equal to D/2.

In an embodiment of the present application, at least one of a distance between two adjacent scan lines or a distance between two adjacent read lines is less than D/2.

In an embodiment of the present application, the diameter D of the light spot ranges from 2 to 4 millimeters.

In an embodiment of the present application, a number of the first scan lines is equal to a number of the second scan lines, and a number of the first read lines is equal to a number of the second read lines.

In an embodiment of the present application, the first scan lines and the second scan lines are alternately arranged, the second read lines are disposed between two adjacent first read lines, or the first read lines are disposed between two adjacent second read lines.

In an embodiment of the present application, the first read lines and the second read lines are alternately arranged, the second scan lines are disposed between two adjacent first scan lines, or the first scan lines are disposed between two adjacent second scan lines.

In an embodiment of the present application, two adjacent second sensing modules and the first sensing modules positioned between the two adjacent second sensing modules are distributed in a rhombic shape or a hexagonal shape; or two adjacent first sensing modules and the second sensing modules positioned between the two adjacent first sensing modules are distributed in the rhombic shape or the hexagonal shape.

Compared with prior art, the present application alternately arranges the first scan lines and the second scan lines and/or alternately arranges the first read lines and the second read lines, and correspondingly, disposes the sensing modules at the intersections of the first scan lines and the first read lines and the intersections of the second scan lines and the second read lines. A number of the sensing modules corresponding to each of the read lines is reduced by arranging a distribution of the sensing modules, and a read time corresponding to each of the sensing modules is further increased. In addition, there is no need to add a large number of the read lines and corresponding read circuits, thereby saving costs.

DESCRIPTION OF DRAWINGS

The following describes specific embodiments of the present application in detail with reference to the accompanying drawings, which will make technical solutions and other beneficial effects of the present application obvious.

DETAILED DESCRIPTION OF EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

In the description of the present application, it should be explained that the terms "center", "portrait", "transverse", "length", "width", "thickness", "upper", "lower", "front", "back", "left", "right", "vertical", "horizontal", "top", "bottom", "inside", "outside", etc. are based on the drawings. The orientation or positional relationship is only for the convenience of describing the present application and simplifying the description, and does not indicate or imply that the device or element referred to must have a specific orientation, structure and operation in a specific orientation, and should not be viewed as limitations of the present application. In addition, terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "multiple" is two or more, unless specifically defined otherwise.

The following application provides many different embodiments or examples for implementing different structures of the present application. To simplify the application of the present application, the components and settings of specific examples are described below. Obviously, these are merely examples instead of limitation of the present application. Furthermore, the present application may repeat reference numbers and/or reference letters in different examples, and such repetition is for the purpose of simplicity and clarity, and does not indicate the relationship between the various embodiments and/or settings. Moreover, the present application provides examples of various specific processes and materials, but the applicability of other processes and/or application of other materials may be appreciated by a person skilled in the art.

Figure 1:
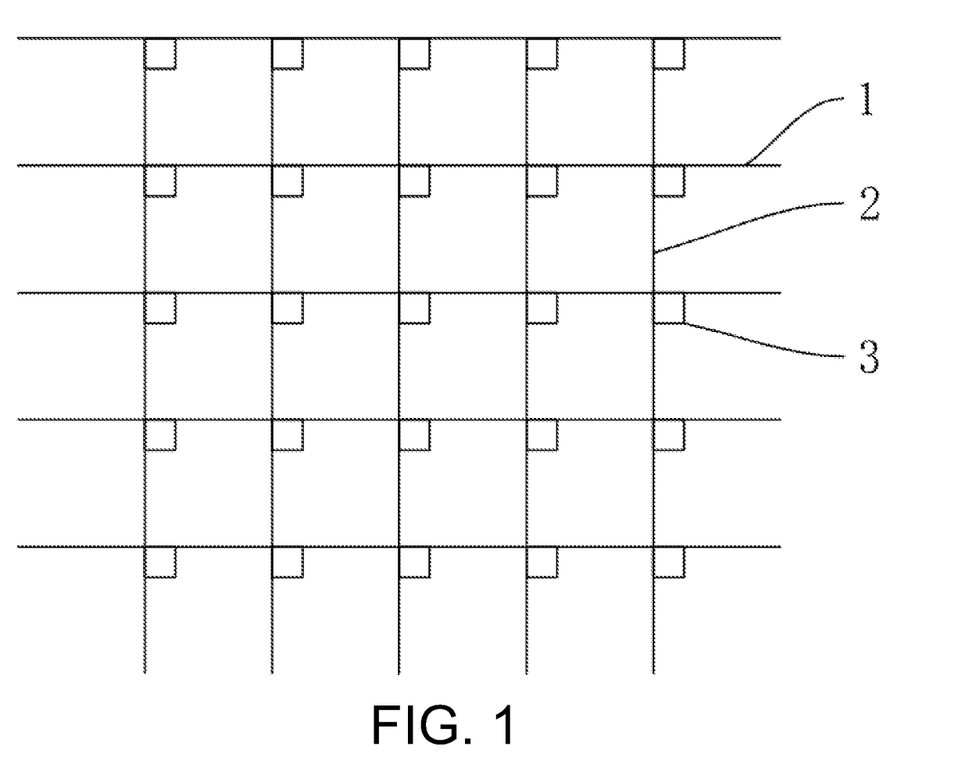
FIG. 1 is a structural schematic diagram of a distribution structure of current one-gate one-data (1G1D) sensing modules.

Please refer to FIG. 1, which is a distribution structure of current one-gate one-data (1G1D) sensing modules. The display panel includes a plurality of scan lines 1 and a plurality of read lines 2 alternately arranged. Each intersection of each of the scan lines 1 and each of the read lines 2 is provided with a sensing module 3. With a size of the display panel increasing, a number of the sensing modules 3 corresponding to each of the read lines 2 also increases. This reduces a read time corresponding to each of the sensing modules 3, thereby affecting accuracy of signal reading.

Figure 2:
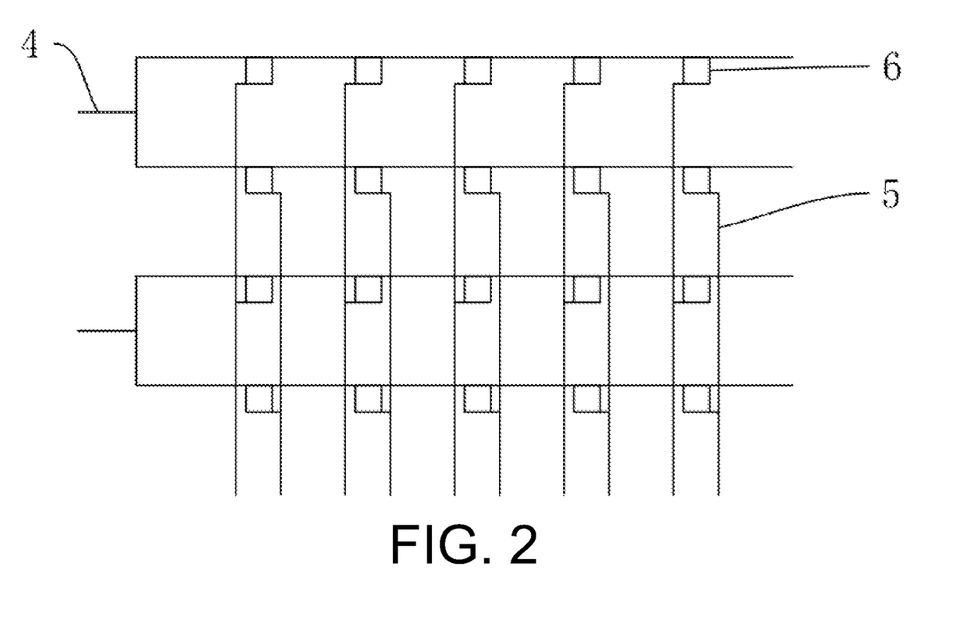
FIG. 2 is a structural schematic diagram of a distribution structure of current half-gate two-data (HG2D) sensing modules.

Please refer to FIG. 2, which is a distribution structure of current half-gate two-data (HG2D) sensing modules. A difference between this distribution structure and the distribution structure in FIG. 1 is that each of scan lines 4 is divided into two branches, and each of the branches corresponds to a row of sensing modules 6. In addition, in two rows of the sensing modules 6 corresponding to a same one of the scan lines 4, two sensing modules 6 in a same column respectively correspond to two read lines 5. A number of the sensing modules 6 corresponding to each of the read lines 5 is reduced by half compared with the 1G1D distribution structure. Therefore, a read time corresponding to each of the sensing modules 6 is increased, but a number of the read lines 5 will be doubled. This configuration of doubled reading circuit greatly increases costs, so the distribution structure of laser sensing modules in the current display panel cannot well balance increasing read time and controlling costs of the sensing modules.

In order to solve the above technical problem, an embodiment of the present application provides a display panel. Please refer to FIG. 3. The display panel includes a plurality of scan lines 10 arranged along a first direction A, a plurality of read lines 20 arranged along a second direction B, and a plurality of sensing modules 30. The second direction B crosses the first direction A and form a preset angle with the first direction A.

Figure 3:
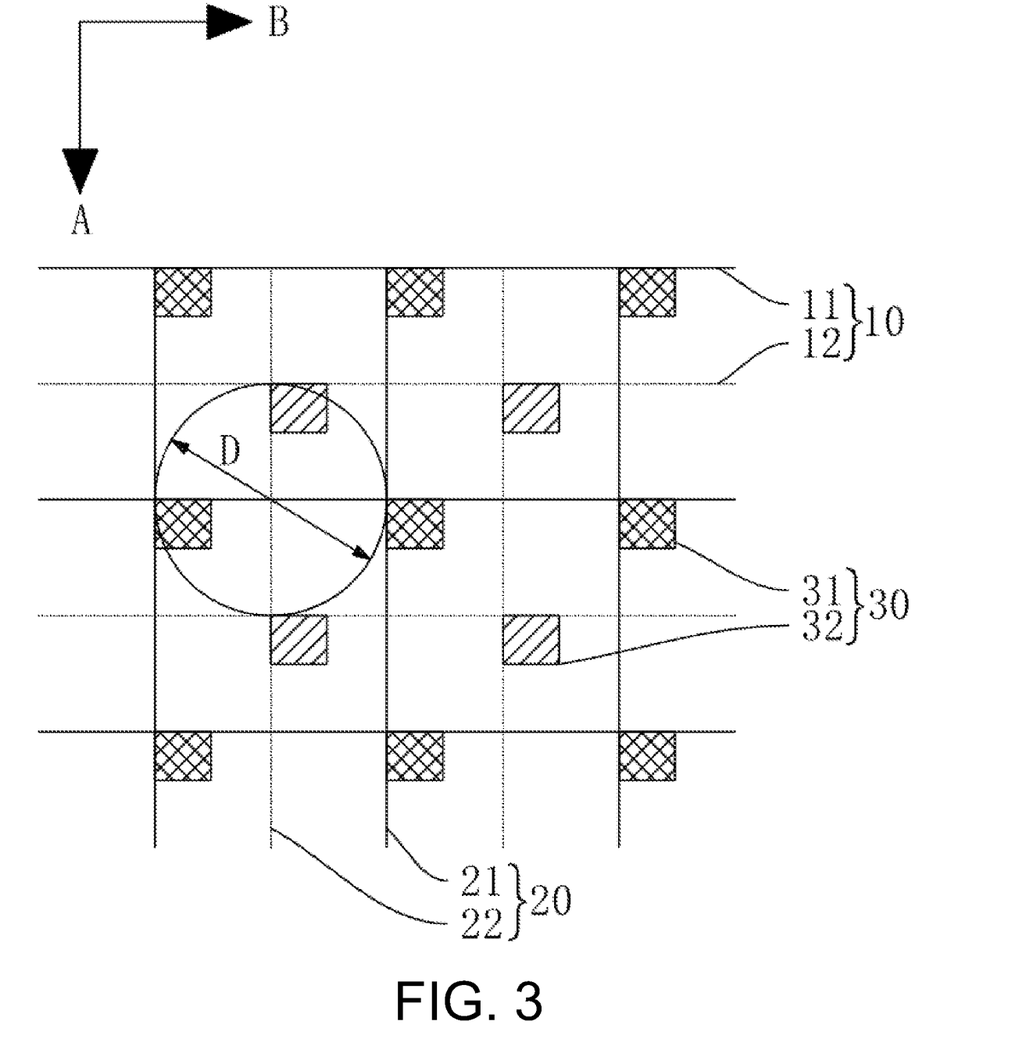
FIG. 3 is a structural schematic diagram of a distribution structure of sensing modules provided by an embodiment of the present application.

The scan lines 10 include a plurality of first scan lines 11 and a plurality of second scan lines 12. The read lines 20 include a plurality of first read lines 21 and a plurality of second read lines 22. The first scan lines 11 and the second scan lines 22 are alternately arranged and/or the first read lines 21 and the second read lines 22 are alternately arranged.

The sensing modules 30 are configured to detect a light spot. At least one of the sensing modules 30 is positioned in a coverage region of the light spot. The sensing modules 30 include a plurality of first sensing modules 31 and a plurality of second sensing modules 32. One of the first sensing modules 31 is disposed at an intersection of any one of the first scan lines 11 and any one of the first read lines 21. One of the second sensing modules 32 is disposed at an intersection of any one of the second scan lines 12 and any one of the second read lines 22.

During a process of an implementation, in an embodiment of the present application, the sensing modules 30 are disposed at the intersections of the first scan lines 11 and the first read lines 21 and the intersections of the second scan lines 12 and the second read lines 22. Furthermore, the first scan lines 11 and the second scan lines 12 are alternately arranged and/or the first read lines 21 and the second read lines 22 are alternately arranged. As a result, a number of the sensing modules 30 corresponding to each of the read lines is reduced, and a sensing time of each of the sensing modules 20 is increased. Moreover, this does not need to add a large number of read lines 20, thereby saving costs.

Furthermore, please continue to refer to FIG. 3, the display panel includes the scan lines 10 arranged along the first direction A and the read lines 20 arranged along the second direction B. The first direction A and the second direction B intersect at the preset angle, and the preset angle is not limited herein. An embodiment of the present application takes the preset angle being equal to 90° as an example, which means that the scan lines 10 and the read lines 20 are arranged in rows and columns. Therefore, the display panel includes a plurality of rows of the scan lines 10 and a plurality of columns of the read lines 20.

The scan lines 10 include the first scan lines 11 and the second scan lines 12. The read lines 20 include the first read lines 21 and the second read lines 22. The first scan lines 11 and the second scan lines 12 can be same signal lines, and the first read lines 21 and the second read lines 22 can be same signal lines. In addition, the first scan lines 11 and the first read lines 21 intersect but are not connected, and the second scan lines 12 and the second read lines 22 also intersect but are not connected.

The display panel includes the sensing modules 30. Specifically, the sensing modules 30 include the first sensing modules 31 corresponding to the intersections of the first scan lines 11 and the first read lines 21 and the second sensing modules 32 corresponding to the intersections of the second scan lines 12 and the second read lines 22. Optionally, the first sensing modules 31 are same as the second sensing modules 32.

Figure 4:
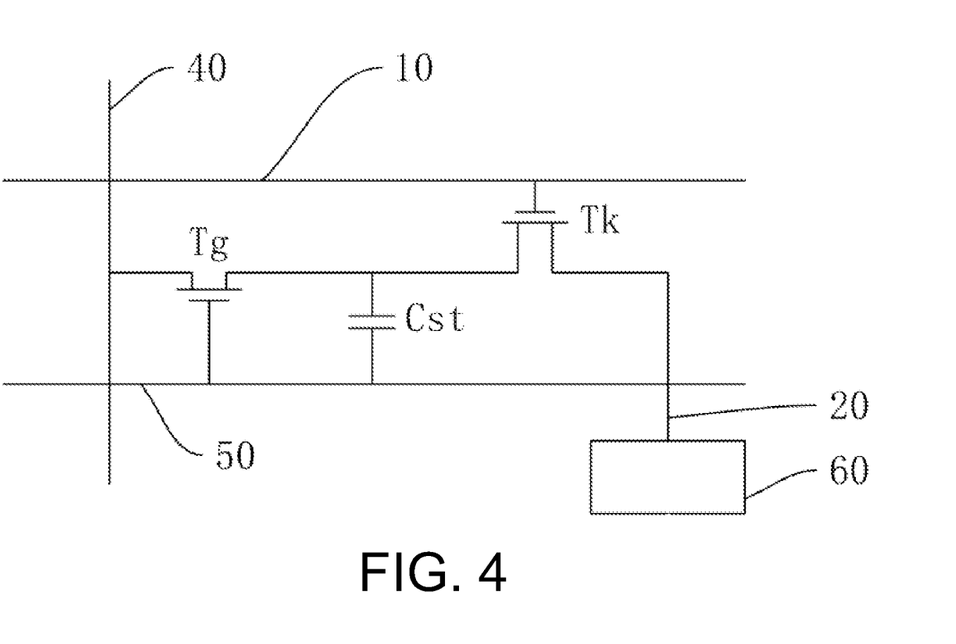
FIG. 4 is a structural schematic diagram of a circuit structure of the sensing modules provided by an embodiment of the present application.

Furthermore, please refer to FIG. 4, which is a structural schematic diagram of a circuit structure of one of the sensing modules 30, the one of The sensing modules 30 include a photosensitive transistor Tg, a switch transistor Tk, and a capacitor Cst. A source of the photosensitive transistor Tg is connected to a first voltage signal line 40. A gate of the photosensitive transistor Tg is connected to a second voltage signal line 50. A drain of the photosensitive transistor Tg is connected to a source of the switch transistor Tk. A gate of the switch transistor Tk is connected to one of the scan lines 10. A drain of the switch transistor Tk is connected to one of the read lines 20. The one of the read lines 20 is connected to a read circuit 60 to read a change of an electrical signal of the one of the sensing modules 30. Both ends of the capacitor Cst are respectively connected to the source and the drain of the switch transistor Tk.

The display panel provided by an embodiment of the present application can be used for recognition and display of a laser pointer, and can be applied to various commercial or educational interactive display devices.

During a process of an implementation, the photosensitive transistor Tg is turned on by the voltage signal in the second voltage signal line 50 and transmits the electrical signal in the first voltage signal line 40 to the source of the switch transistor Tk. Then, the switch transistor Tk is turned on by the voltage signal in the scan lines 10 and transmits the electrical signal connected to the source of the switch transistor Tk to the one of the read lines 20. Then, the one of the read lines 20 transmits the electrical signal to the read circuit 60 to read an electrical signal condition in the one of the sensing modules 30. When a laser is irradiated on the photosensitive transistor Tg, the electrical signal passing through the photosensitive transistor Tg will be changed. The change of the electrical signal is transmitted to the reading circuit 60 to detect a position irradiated by the laser, so as to realize recognition of the position of the light spot irradiated by the laser pointer.

In an embodiment of the present application, a minimum distance between one of the first sensing modules 31 and one of the second sensing modules 32 is less than or equal to $$\frac{\sqrt{2}}{2}D.$$

D is a diameter of the light spot. Therefore, at least one of the sensing modules 30 is positioned in the coverage region of the light spot. In an embodiment of the present application, the diameter D of the light spot ranges from 2 to 4 millimeters (mm), which means that D is less than or equal to 2 mm and is greater than or equal to 4 mm.

In an embodiment of the present application, please refer to FIG. 3, the first scan lines 11 and the second scan lines 12 are alternately arranged, and the first read lines 21 and the second read lines 22 are alternately arranged. The first sensing modules 31 are disposed at the intersections of the first scan lines 11 and the first read lines 21. The second sensing modules 32 are disposed at the intersections of the second scan lines 12 and the second read lines 22. The first sensing modules 31 corresponding to the first scan lines 11 intersect the second sensing modules 32 corresponding to adjacent second scan lines 12, so as to reduce the number of the sensing modules 30 corresponding to each of the read lines 20.

In this embodiment, distances between every two adjacent scan lines 10 are equal, and distances between every two adjacent read lines 20 are equal. Furthermore, each of the distances between every two adjacent scan lines 10 is equal to each of the distances between every two adjacent read lines 20.

Two adjacent first sensing modules 31 and two second sensing modules 32 positioned between the two adjacent first sensing modules 31 are distributed in the rhombic shape. Two adjacent second sensing modules 32 and two first sensing modules 31 positioned between the two adjacent second sensing modules 32 are distributed in the rhombic shape. Two first sensing modules 31 and two second sensing modules 32 are respectively positioned at four corners of the rhombic shape. In this embodiment, inner angles of the rhombic shape are all 90°, and a side length of the rhombic shape is equal to $$\frac{\sqrt{2}}{2}D.$$

Therefore, when the laser pointer irradiates the display panel and forms the light spot, because the diameter of the light spot is D, there can be at most four sensing modules 30 corresponding to the light spot in this embodiment to increase recognition accuracy.

Following the above description, a number of the first scan lines 11 and a number of the second scan lines 12 are equal, and a number of the first read lines 21 and a number of the second read lines 22 are equal. In this way, numbers of the sensing modules 30 corresponding to each of the scan lines 10 can be equal, and numbers of the sensing modules 30 corresponding to each of the read lines 20 can be equal. Therefore, the electrical signal can be evenly transmitted, and the read time of each of the sensing modules 30 can be same.

As shown in Table 1 below, which is a result of a reading test of the distribution structure of the sensing modules provided by this embodiment, F, G, and O in the table are set values, which can be determined according to an actual production and are not limited herein. In this embodiment, a current 1G1D distribution structure, a current HG2D distribution structure, and the distribution structure of the sensing modules provided by this embodiment are tested. The three are set to a same refresh frequency F and a same refresh time 1/F. In the 1G1D distribution structure, a number of scan lines is set to G, a number of read lines is set to O, and a read time is 1/(FG). In the HG2D distribution structure, a number of scan lines is set to G/2, a number of read lines is set to 2*O, and a read time is 2/(FG). In the distribution structure of the sensing modules provided by this embodiment, the number of the scan lines 10 is set to 2^0.5*G, the number of the read lines 20 is set to 2^0.5*O, and the read time is 2^0.5/(FG). It can be seen from the above results that the distribution structure of the sensing modules provided by this embodiment increases the read time compared with the 1G1D distribution structure, and reduces the number of the read lines 20 compared with the HG2D distribution structure. In this way, the number of the read circuits can be reduced, thereby saving costs. Therefore, compared with prior art, the distribution structure of the sensing modules provided by this embodiment can balance increasing read time and controlling costs.

TABLE 1 comparison of read test parameters

|  | 1G1D | HG2D | distribution structure of sensing modules provided by this embodiment |
|---|---|---|---|
| refresh frequency |  |  | F |
| refresh time |  |  | 1/F |
| number of scan lines | G | G/2 | 2^0.5*G |
| number of read lines | O | 2*O | 2^0.5*O |
| read time | 1/(FG) | 2/(FG) | 2^0.5/(FG) |

In this embodiment, the first scan lines 11 and the second scan lines 12 are alternately arranged, the first read lines 21 and the second read lines 22 are alternately arranged, and the intersections of the first scan lines 11 and the first read lines 21 and the intersections of the second scan lines 12 and the second read lines 22 are provided with the sensing modules 30. The number of the sensing modules 30 corresponding to each of the read lines 20 is reduced by arranging a distribution of the sensing modules 30, and the read time corresponding to each of the sensing modules 30 is further increased. In addition, there is no need to add a large number of the read lines 20 and the corresponding read circuits 60, thereby saving costs.

Figure 5:
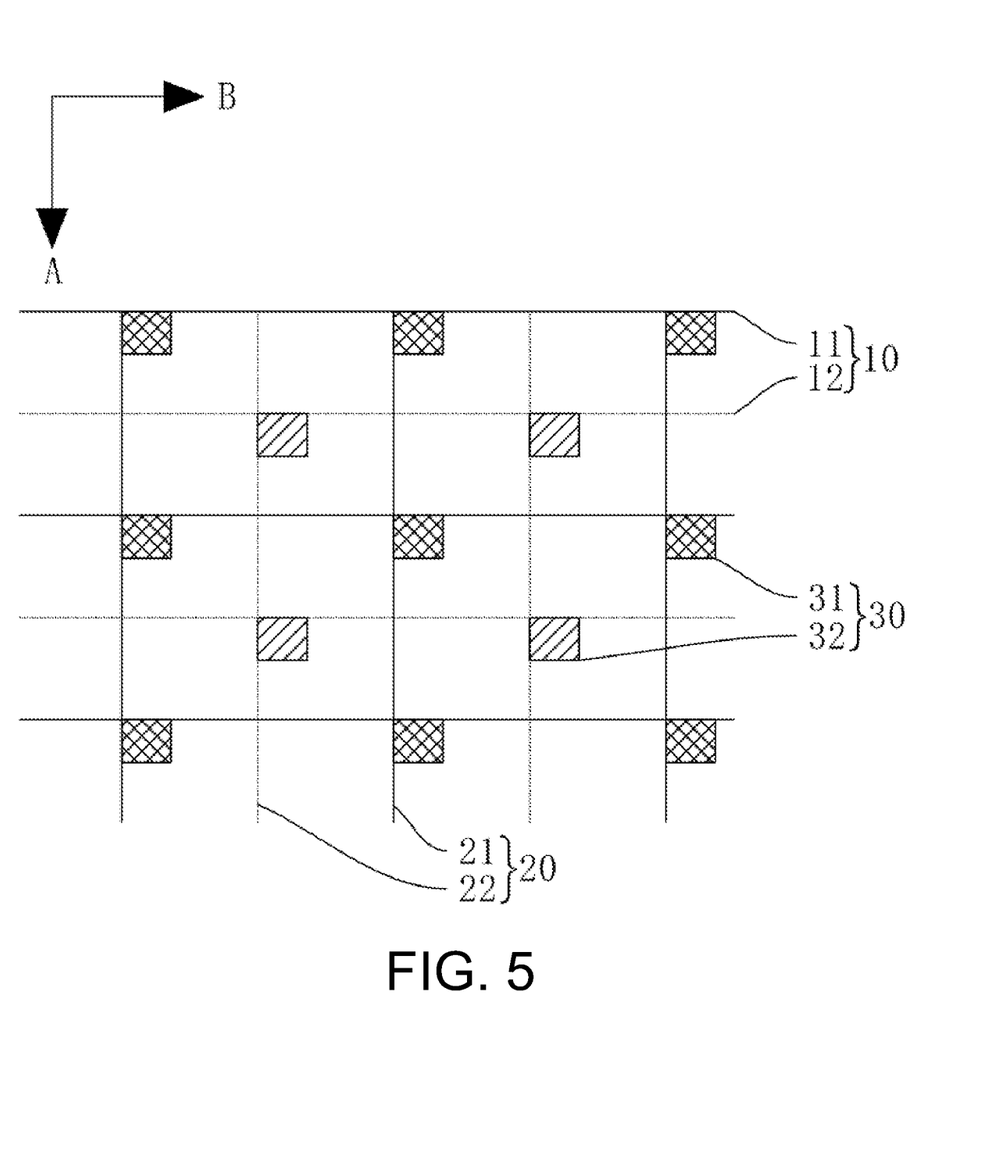
FIG. 5 is a structural schematic diagram of a distribution structure of other sensing modules provided by an embodiment of the present application.

In another embodiment of the present application, please refer to FIG. 5, a difference between this embodiment and the first embodiment is that a distance between one of the first scan lines 11 and one of the second scan lines 12 is not equal to a distance between one of the first read lines 21 and one of the second read lines 22. Further, the distance between one of the first scan lines 11 and one of the second scan lines 12 is less than the distance between one of the first read lines 21 and one of the second read lines 22. Optionally, the distance between one of the first scan lines 11 and one of the second scan lines 12 is less than D/2, the distance between one of the first read lines 21 and one of the second read lines 22 is greater than D/2, or the distance between one of the first scan lines 11 and one of the second scan lines 12 and the distance between one of the first read lines 21 and one of the second read lines 22 are both less than D/2.

Two adjacent first sensing modules 31 and two second sensing modules 32 positioned between the two adjacent first sensing modules 31 are distributed in the rhombic shape. Two adjacent second sensing modules 32 and two first sensing modules 31 positioned between the two adjacent second sensing modules 32 are distributed in the rhombic shape. Two first sensing modules 31 and two second sensing modules 32 are respectively positioned at four corners of the rhombic shape. Two opposite inner angles of the rhombic shape are less than 90°, and the other two opposite inner angles are greater than 90°. A side length of the rhombic shape can be less than or equal to $$\frac{\sqrt{2}}{2}D.$$

In addition, in this embodiment, a number of the first scan lines 11 and a number of the second scan lines 12 are equal, and a number of the first read lines 21 and a number of the second read lines 22 are equal. In this way, numbers of the sensing modules 30 corresponding to each of the scan lines 10 can be equal, and numbers of the sensing modules 30 corresponding to each of the read lines 20 can be equal. Therefore, the electrical signal can be evenly transmitted, and the read time of each of the sensing modules 30 can be same.

It should be explained that in another optional embodiment of the present application, the distance between one of the first scan lines 11 and one of the second scan lines 12 can be greater than the distance between one of the first read lines 21 and one of the second read lines 22. Optionally, the distance between one of the first scan lines 11 and one of the second scan lines 12 is greater than D/2, the distance between one of the first read lines 21 and one of the second read lines 22 is less than D/2, or the distance between one of the first scan lines 11 and one of the second scan lines 12 and the distance between one of the first read lines 21 and one of the second read lines 22 are both less than D/2.

In this embodiment, the first scan lines 11 and the second scan lines 12 are alternately arranged, the first read lines 21 and the second read lines 22 are alternately arranged, and the intersections of the first scan lines 11 and the first read lines 21 and the intersections of the second scan lines 12 and the second read lines 22 are provided with the sensing modules 30. The number of the sensing modules 30 corresponding to each of the read lines 20 is reduced by arranging a distribution of the sensing modules 30, and the read time corresponding to each of the sensing modules 30 is further increased. In addition, there is no need to add a large number of the read lines 20 and the corresponding read circuits 60, thereby saving costs.

Figure 6:
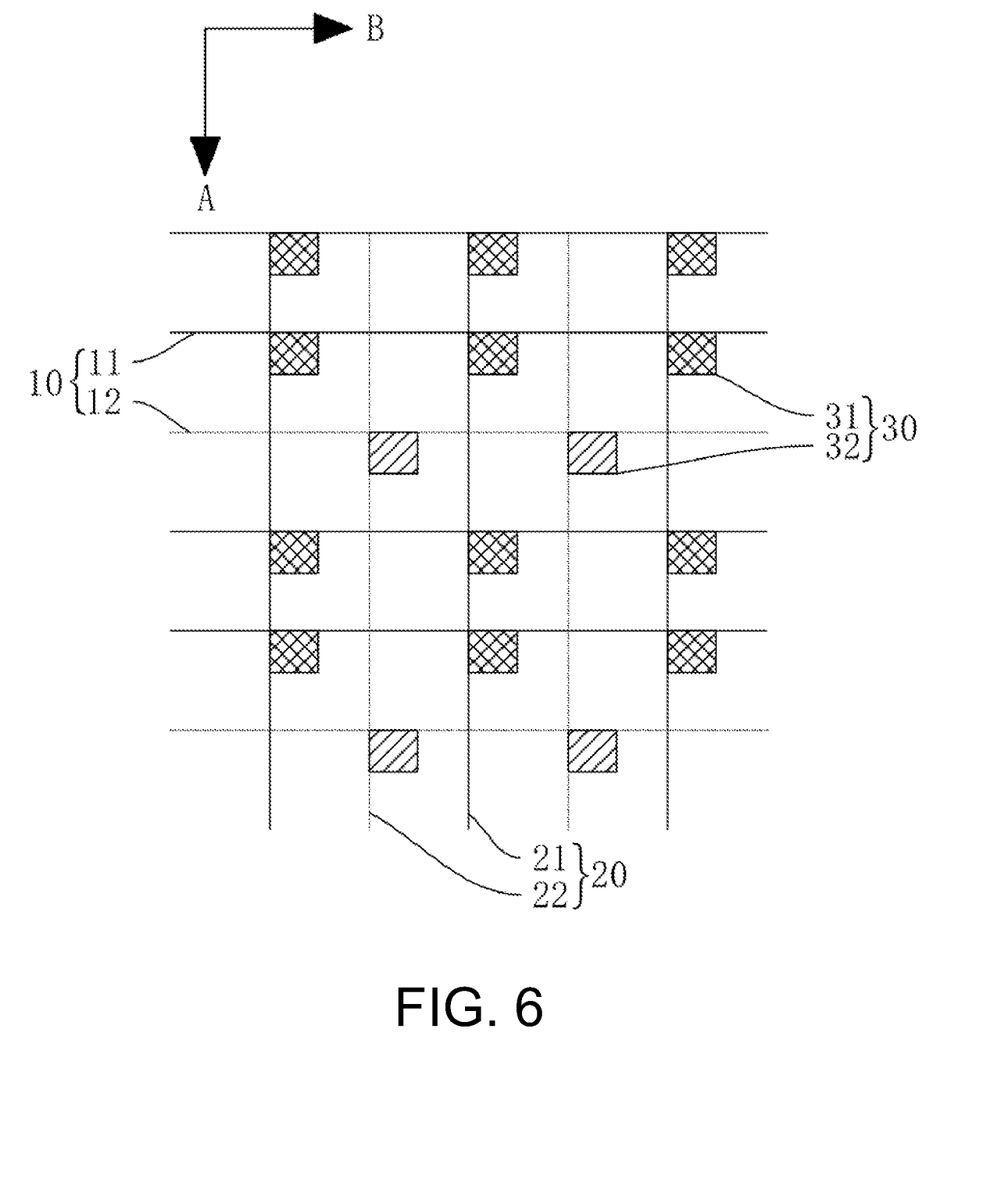
FIG. 6 is a structural schematic diagram of a distribution structure of other sensing modules provided by an embodiment of the present application.

In another embodiment of the present application, please refer to FIG. 6, a difference between this embodiment and the first embodiment is that the first read lines 21 and the second read lines 22 are alternately arranged, and there are two first scan lines 11 disposed between two adjacent second scan lines 12.

In this embodiment, along an extension direction of the second scan lines 12, two adjacent second sensing modules 32 and two first sensing modules 31 positioned between the two adjacent second sensing modules 32 are distributed in the rhombic shape. Along an extension direction of the second read lines 22, two adjacent second sensing modules 32 and four first sensing modules 31 positioned between the two adjacent second sensing modules 32 are distributed in a hexagonal shape.

Optionally, at least the distance between one of the first read lines 21 and one of the second read lines 22 is less than D/2.

It should be explained that in another optional embodiment of the present application, multiple first scan lines 11 can be provided between two adjacent second scan lines 12, such as three, four, or five first scan lines 11. In addition, in another optional embodiment of the present application, multiple second scan lines 12 can also be provided between two adjacent first scan lines 11, and two adjacent first sensing modules 31 and the second sensing modules 32 positioned between the two adjacent first sensing modules 31 are distributed in the hexagonal shape, which is not limited herein.

In this embodiment, the first read lines 21 and the second read lines 22 are alternately arranged, and the intersections of the first scan lines 11 and the first read lines 21 and the intersections of the second scan lines 12 and the second read lines 22 are provided with the sensing modules 30. The number of the sensing modules 30 corresponding to each of the read lines 20 is reduced by arranging a distribution of the sensing modules 30, and the read time corresponding to each of the sensing modules 30 is further increased. In addition, there is no need to add a large number of the read lines 20 and the corresponding read circuits 60, thereby saving costs.

Figure 7:
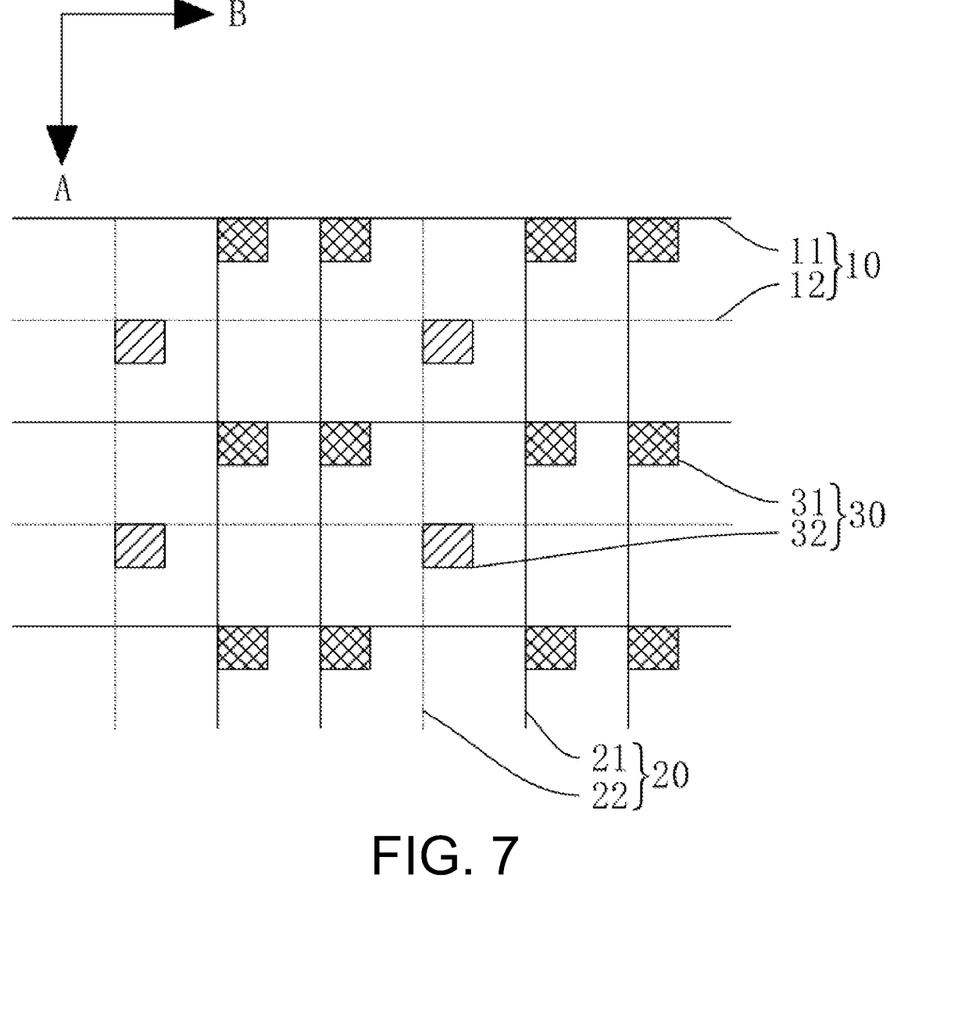
FIG. 7 is a structural schematic diagram of a distribution structure of other sensing modules provided by an embodiment of the present application.

In another embodiment of the present application, please refer to FIG. 7, a difference between this embodiment and the first embodiment is that the first scan lines 11 and the second scan lines 12 are alternately arranged, and there are two first read lines 21 disposed between two adjacent second read lines 22.

Optionally, at least the distance between one of the first scan lines 11 and one of the second scan lines 12 is less than D/2.

It should be explained that in another optional embodiment of the present application, multiple first read lines 21 can be provided between two adjacent second read lines 22, such as three, four, or five first read lines 21. In addition, in another optional embodiment of the present application, multiple second read lines 22 can also be provided between two adjacent first read lines 21, which is not limited herein.

In this embodiment, the first scan lines 11 and the second scan lines 12 are alternately arranged, and the intersections of the first scan lines 11 and the first read lines 21 and the intersections of the second scan lines 12 and the second read lines 22 are provided with the sensing modules 30. The number of the sensing modules 30 corresponding to each of the read lines 20 is reduced by arranging a distribution of the sensing modules 30, and the read time corresponding to each of the sensing modules 30 is further increased. In addition, there is no need to add a large number of the read lines 20 and the corresponding read circuits 60, thereby saving costs.

In addition, an embodiment of the present application further provides a display device. The display device includes the display panel described in the above embodiments. The display panel has a same structure as the display panel in the above embodiments and is not repeatedly described herein.

In the above embodiments, the descriptions of the various embodiments are different in emphases, for contents not described in detail, please refer to related description of other embodiments.

The display panel and the display device provided by embodiments of the present application are described in detail above, and the description of embodiments above is only for helping to understand technical solutions of the present application and its core idea. It should be understood that for a person of ordinary skill in the art can make various modifications of the technical solutions of the embodiments of the present application above. However, it does not depart from the scope of the technical solutions of the embodiments of the present application.

What is claimed is:

1. A display panel, comprising:
a plurality of scan lines arranged along a first direction and comprising a plurality of first scan lines and a plurality of second scan lines;
a plurality of read lines arranged along a second direction and comprising a plurality of first read lines and a plurality of second read lines, the second direction crosses the first direction and form a preset angle with the first direction, the first scan lines and the second scan lines are alternately arranged, and/or the first read lines and the second read lines are alternately arranged; and
a plurality of sensing modules configured to detect a light spot, wherein at least one of the sensing modules is positioned in a coverage region of the light spot, the sensing modules comprise a plurality of first sensing modules and a plurality of second sensing modules, one of the first sensing modules is disposed at an intersection of any one of the first scan lines and any one of the first read lines, and one of the second sensing modules is disposed at an intersection of any one of the second scan lines and any one of the second read lines;
wherein a minimum distance between one of the first sensing modules and one of the second sensing modules is less than or equal to $$\frac{\sqrt{2}}{2}D,$$

and D is a diameter of the light spot.

2. The display panel according to claim 1, wherein a distance between two adjacent scan lines is equal to D/2, and a distance between two adjacent read lines is equal to D/2.

3. The display panel according to claim 1, wherein at least one of a distance between two adjacent scan lines or a distance between two adjacent read lines is less than D/2.

4. The display panel according to claim 1, wherein the diameter D of the light spot ranges from 2 to 4 millimeters.

5. The display panel according to claim 1, wherein a number of the first scan lines is equal to a number of the second scan lines, and a number of the first read lines is equal to a number of the second read lines.

6. The display panel according to claim 1, wherein the first scan lines and the second scan lines are alternately arranged, the second read lines are disposed between two adjacent first read lines, or the first read lines are disposed between two adjacent second read lines.

7. The display panel according to claim 1, wherein the first read lines and the second read lines are alternately arranged, the second scan lines are disposed between two adjacent first scan lines, or the first scan lines are disposed between two adjacent second scan lines.

8. The display panel according to claim 1, wherein two adjacent second sensing modules and the first sensing modules positioned between the two adjacent second sensing modules are distributed in a rhombic shape or a hexagonal shape; or
two adjacent first sensing modules and the second sensing modules positioned between the two adjacent first sensing modules are distributed in the rhombic shape or the hexagonal shape.

9. A display device, comprising a display panel, wherein the display panel comprises:
a plurality of scan lines arranged along a first direction and comprising a plurality of first scan lines and a plurality of second scan lines;
a plurality of read lines arranged along a second direction and comprising a plurality of first read lines and a plurality of second read lines, the second direction crosses the first direction and form a preset angle with the first direction, the first scan lines and the second scan lines are alternately arranged, and/or the first read lines and the second read lines are alternately arranged; and
a plurality of sensing modules configured to detect a light spot, wherein at least one of the sensing modules is positioned in a coverage region of the light spot, the sensing modules comprise a plurality of first sensing modules and a plurality of second sensing modules, one of the first sensing modules is disposed at an intersection of any one of the first scan lines and any one of the first read lines, and one of the second sensing modules is disposed at an intersection of any one of the second scan lines and any one of the second read lines;
wherein a minimum distance between one of the first sensing modules and one of the second sensing modules is less than or equal to $$\frac{\sqrt{2}}{2}D,$$

and D is a diameter of the light spot.

10. The display device according to claim 9, wherein a distance between two adjacent scan lines is equal to D/2, and a distance between two adjacent read lines is equal to D/2.

11. The display device according to claim 9, wherein at least one of a distance between two adjacent scan lines or a distance between two adjacent read lines is less than D/2.

12. The display device according to claim 9, wherein the diameter D of the light spot ranges from 2 to 4 millimeters.

13. The display device according to claim 9, wherein a number of the first scan lines is equal to a number of the second scan lines, and a number of the first read lines is equal to a number of the second read lines.

14. The display device according to claim 9, wherein the first scan lines and the second scan lines are alternately arranged, the second read lines are disposed between two adjacent first read lines, or the first read lines are disposed between two adjacent second read lines.

15. The display device according to claim 9, wherein the first read lines and the second read lines are alternately arranged, the second scan lines are disposed between two adjacent first scan lines, or the first scan lines are disposed between two adjacent second scan lines.

16. The display device according to claim 9, wherein two adjacent second sensing modules and the first sensing modules positioned between the two adjacent second sensing modules are distributed in a rhombic shape or a hexagonal shape; or two adjacent first sensing modules and the second sensing modules positioned between the two adjacent first sensing modules are distributed in the rhombic shape or the hexagonal shape.

\* \* \* \* \*